(12) United States Patent
Voss et al.

(10) Patent No.: US 9,292,032 B2
(45) Date of Patent: Mar. 22, 2016

(54) OPERATOR CONTROL DEVICE

(75) Inventors: Markus Voss, Munich (DE); Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 264 days.

(21) Appl. No.: 13/032,961

(22) Filed: Feb. 23, 2011

(65) Prior Publication Data

US 2011/0214525 A1 Sep. 8, 2011

(30) Foreign Application Priority Data

Mar. 4, 2010 (DE) .......................... 10 2010 010 095

(51) Int. Cl.
*G05G 1/10* (2006.01)
*G05G 1/08* (2006.01)
*B60R 16/00* (2006.01)

(52) U.S. Cl.
CPC ................ *G05G 1/08* (2013.01); *B60R 16/005* (2013.01); *Y10T 74/20474* (2015.01)

(58) Field of Classification Search
CPC .......... B60R 16/005; G05G 1/08; G05G 1/10; Y10T 74/2074
USPC ................................ 74/553, 555, 10 R, 10.22
See application file for complete search history.

(56) References Cited

U.S. PATENT DOCUMENTS

| | | | |
|---|---|---|---|
| 1,389,267 A * | 8/1921 | Norton et al. ................ | 192/18 R |
| 1,825,511 A * | 9/1931 | Denton .......................... | 74/10.45 |
| 2,346,030 A * | 4/1944 | Johnson ........................ | 74/10.45 |
| 2,855,516 A * | 10/1958 | Lyman et al. .................. | 334/48 |
| 3,064,494 A * | 11/1962 | Brewster ......................... | 74/504 |
| 3,621,722 A * | 11/1971 | Newberry ....................... | 74/10.8 |
| 6,041,675 A | 3/2000 | Willomitzer | |
| 6,234,269 B1 | 5/2001 | Salzer et al. | |
| 6,378,388 B1 * | 4/2002 | Lacroix ......................... | 74/10.85 |
| 8,051,740 B2 * | 11/2011 | Giefer et al. .................. | 74/473.21 |
| 2005/0034557 A1 * | 2/2005 | Anderbrugge et al. ......... | 74/553 |

(Continued)

FOREIGN PATENT DOCUMENTS

| | | |
|---|---|---|
| DE | 1 095 078 | 12/1960 |
| DE | 88 11 426.0 U1 | 12/1988 |

(Continued)

OTHER PUBLICATIONS

"Vehicle I Define Vehicle at Dictionary.com" from dictionary.reference.com/browser/vehicle?s=t Apr. 27, 2014.*

(Continued)

*Primary Examiner* — Vinh Luong
(74) *Attorney, Agent, or Firm* — Crowell & Moring LLP

(57) ABSTRACT

An operator control device for operating a plurality of functions, in particular, in a vehicle, has at least a first rotary actuator and a second rotary actuator. A respective rotary actuator is assigned a function of the vehicle. The first rotary actuator has a first rotary body and a first operator control body, where the first operator control body is mechanically coupled with the first rotary body. The second rotary actuator has a second rotary body and a second operator control body, where the second operator control body is mechanically coupled with the second rotary body. The first rotary body and the second rotary body are arranged coaxially in each other such that they can be rotated about a common axis of rotation. At least one operator control body has a grip area that is designed in a lever-like manner.

9 Claims, 3 Drawing Sheets

(56) References Cited

U.S. PATENT DOCUMENTS

| | | |
|---|---|---|
| 2005/0195946 A1 | 9/2005 | Hornig |
| 2007/0029181 A1* | 2/2007 | Ogawa ................. 200/336 |
| 2008/0229864 A1 | 9/2008 | Isono et al. |
| 2009/0076676 A1* | 3/2009 | Yamamoto et al. ......... 701/29 |
| 2010/0218639 A1* | 9/2010 | Kramlich ................. 74/504 |
| 2013/0118293 A1* | 5/2013 | Sambar .................. 74/504 |
| 2013/0220060 A1* | 8/2013 | Sano et al. .............. 74/504 |

FOREIGN PATENT DOCUMENTS

| | | |
|---|---|---|
| DE | 197 11 615 A1 | 9/1998 |
| DE | 198 32 870 C1 | 4/1999 |
| DE | 102 61 284 A1 | 7/2004 |
| DE | 103 13 621 A1 | 10/2004 |
| DE | 10 2004 010 205 B3 | 10/2005 |
| DE | 10 2009 006 031 A1 | 12/2009 |

OTHER PUBLICATIONS

German Search Report dated Nov. 4, 2010 including partial English-language translation (Nine (9) pages).

* cited by examiner

OPERATOR CONTROL DEVICE

CROSS-REFERENCE TO RELATED APPLICATION

This application claims priority under 35 U.S.C. §119 from German Patent Application No. DE 10 2010 010 095.1, filed Mar. 4, 2010, the entire disclosure of which is herein expressly incorporated by reference.

BACKGROUND AND SUMMARY OF THE INVENTION

The invention relates to an operator control device that is intended for operating a plurality of functions, in particular, in a vehicle, and that has at least a first rotary actuator and a second rotary actuator.

Modern motor vehicles have a plethora of electronic devices, which do not work autonomously, but rather can or must be operated by the vehicle driver or other vehicle occupants. As the complexity of the devices increases, there is a need for more elaborate operator control devices. For example, in modern motor vehicles it is possible to set the gas pedal characteristics, the exhaust gas flap position, the gear shift times, the steering characteristics, and the damper characteristics by an array of individual switches and/or operator control elements.

The object of the invention is to provide an operator control device that is intended for operating a plurality of functions in a vehicle and that is easy to operate by a vehicle occupant, in particular a vehicle driver.

The invention is characterized by an operator control device for operating a plurality of functions, in particular, in a vehicle. The operator control device has at least a first rotary actuator and a second rotary actuator. A respective rotary actuator is assigned a function of the vehicle. The first rotary actuator has a first rotary body and a first operator control body, wherein the first operator control body is mechanically coupled with the first rotary body. The second rotary actuator has a second rotary body and a second operator control body, wherein the second operator control body is mechanically coupled with the second rotary body. The first rotary body and the second rotary body are arranged coaxially in each other such that they can be rotated about a common axis of rotation. At least one operator control body has a grip area that is designed in a lever-like manner.

In particular, the first and second rotary bodies are arranged so as to overlap in the axial direction. The rotational kinematics of the rotary bodies is configured so as to latch in a monostable, bistable or multistable manner in one or two directions of movement and so as to be rotatable about the axis of rotation. The latching rotational kinematics of the rotary bodies simplifies the operating convenience of the rotary actuators and reduces the probability of an unintentional operating error on the part of the vehicle driver or other vehicle occupants. The integration of several operator control elements in an operator control device makes possible a compact design, as a result of which it is possible to reduce the space and number of parts and to achieve cost benefits. Furthermore, assigning a number of related vehicle functions— for example, a number of vehicle functions from the driving dynamics area—to an operator control device makes it possible to improve the intuitive use. Moreover, the lever-like configuration of the grip area of the operator control bodies of the rotary actuators makes it possible to simplify the operating use.

According to one advantageous embodiment of the invention, at least one operator control body has at least one additional operator control element for operating an additional vehicle function.

According to an additional advantageous embodiment of the invention, the additional operator control element is constructed as a pressure switch. As a result, additional simple switching functions can be implemented. The pressure switch can be designed, for example, so as to be momentary, latching, or similar to a joystick. The pressure switch surface can have one or more indicator elements, for example, backlit pictograms.

According to another advantageous embodiment of the invention, the additional operator control element is disposed in the grip area of the operator control body. The advantage of such an arrangement is that it makes it easy to access and simple to operate the operator control element. If the functions of the respective rotary actuator that are to be controlled and the integrated operator control element are correlated, then such an arrangement can improve the intuitive use.

According to an additional advantageous embodiment of the invention, the operator control element is mounted in a displaceable manner along a lever axis and/or mounted in a rotatable manner about the lever axis. This arrangement enables a flexible design of the operator control element. The rotational kinematics of the operator control element can be designed so as to be latching in a monostable, bistable or multistable manner in one or two directions of movement and can be designed so as to be rotatable about the lever axis. The displacing kinematics of the operator control element can be designed so as to be latching in a monostable, bistable or multistable manner in one or two directions of movement along the lever axis.

According to another advantageous embodiment of the invention, at least one operator control body has at least one display unit. The display unit can be designed, for example, as a display, as a function display, as an electrical and/or mechanical display, as at least one optionally lit pictogram, and/or as writing. The display unit makes it possible, for example, to easily recognize the function of the operator control body and/or additional operator control elements. It can be used as an additional source of information for the vehicle driver and/or other vehicle occupants.

According to another advantageous embodiment of the invention, the first rotary body encloses radially a carrier body. In this case the carrier body is mounted in a rotationally rigid manner relative to the axis of rotation, and the carrier body has at least one additional operator control element or at least one display unit. This arrangement makes it possible to mount in a rotationally rigid manner the display unit and/or the operator control element, thus enhancing the operating convenience and/or making it easier to read the display unit.

According to an additional advantageous embodiment of the invention, one of the operator control bodies is constructed such that it encloses the operator control device on the front face and at least partially in the radial direction. Owing to the device cover formed by the operator control body, the operator control device is protected in an advantageous way against dirt and/or any mechanical loads.

According to another advantageous embodiment of the invention, the operator control device has a cover, which encloses the operator control device on the front face and at least partially in the radial direction.

Furthermore, the invention relates to an arrangement of an operator control device in a center console, in a door region, and/or in an instrument panel in the passenger compartment of a vehicle in one of the above-described embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
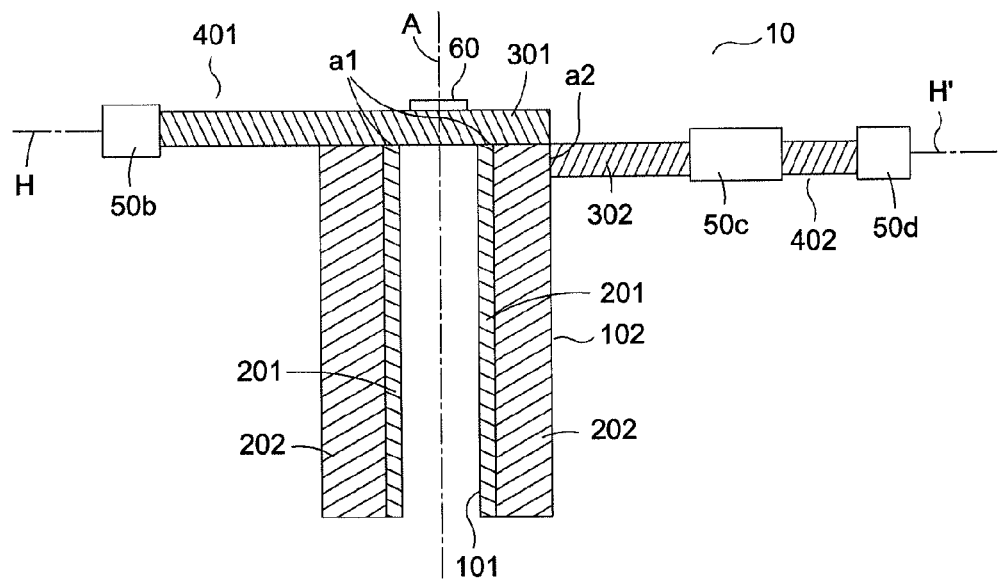
FIG. 1 is a cross sectional view of a first embodiment of an operator control device 10.

The operator control device 10, depicted in FIG. 1, has a plurality of rotary actuators 101, 102. In total, there are two rotary actuators 101, 102. The rotary actuators 101, 102 are assigned different functions, which may be, for example, two functions from the area of the driving dynamics, for example, setting a gas pedal characteristic and an exhaust gas flap position. The rotary actuators 101, 102 have in each case a rotary body 201, 202 and an operator control body 301, 302, wherein the respective rotary body 201, 202 is mechanically coupled with an attachment side of its respective operator control body 301, 302, where a first attachment side a1 of rotary body 201 is perpendicularly oriented to a second attachment side a2 of rotary body 202. The rotary bodies 201, 202 are arranged coaxially with each other, such as coaxially inside one another, so as to be rotatable about a common axis of rotation A.

The operator control bodies 301, 302 have in each case a grip area 401, 402, which is constructed in the manner of a lever. The operator control body 301, 302 and the rotary body 201, 202 can be constructed so as to form a single piece or multiple pieces. The second rotary body 202 is constructed in the shape of a ring (circle) or cylinder, and the first rotary body 201 can be constructed in the shape of a ring (circle) or cylinder.

The first operator control body 301 is designed on the front face with at least one display unit 60, for example as a display. The display can be, for example, a stopwatch display. Instead or in addition to the display unit 60, the first operator control body 301 can also have at least one additional operator control element 50. The first operator control body 301 has in the grip area 401 an additional operator control element 50b. The additional operator control element 50b is mounted, for example, in a rotatable manner about a first lever axis H. The second operator control body 302 has in the grip area 402 two additional operator control elements 50c, 50d. A first operator control element 50c is mounted, for example, in a displaceable manner along a second lever axis H'. A second operator control element 50d is mounted, for example, in a rotatable manner about a second lever axis H'.

Figure 2:
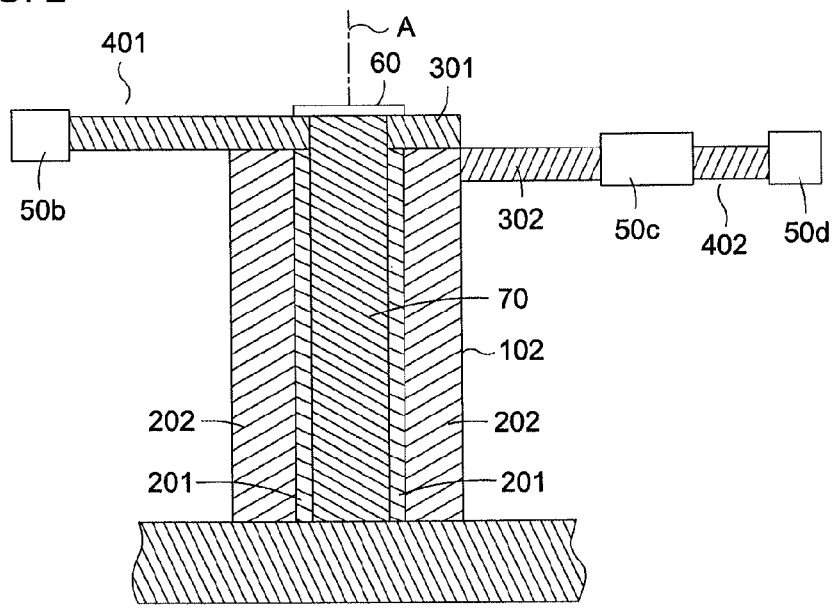
FIG. 2 is a cross sectional view of a second embodiment of an operator control device 10.

The fundamental difference between the operator control device 10, depicted in FIG. 2, and the operator control device 10, depicted in FIG. 1, is that in FIG. 2 the operator control device 10 has a carrier body 70. The first rotary body 201 encloses radially the carrier body 70. The carrier body 70 is arranged in a rotationally rigid manner in relation to the axis of rotation A. The carrier body 70 has on its front face a display unit 60. It is also possible that the carrier body 70 has one or more additional operator control elements 50a and/or one or more display units 60. The carrier body 70 can exhibit a cross section having the shape of a ring or a circle.

Figure 3:
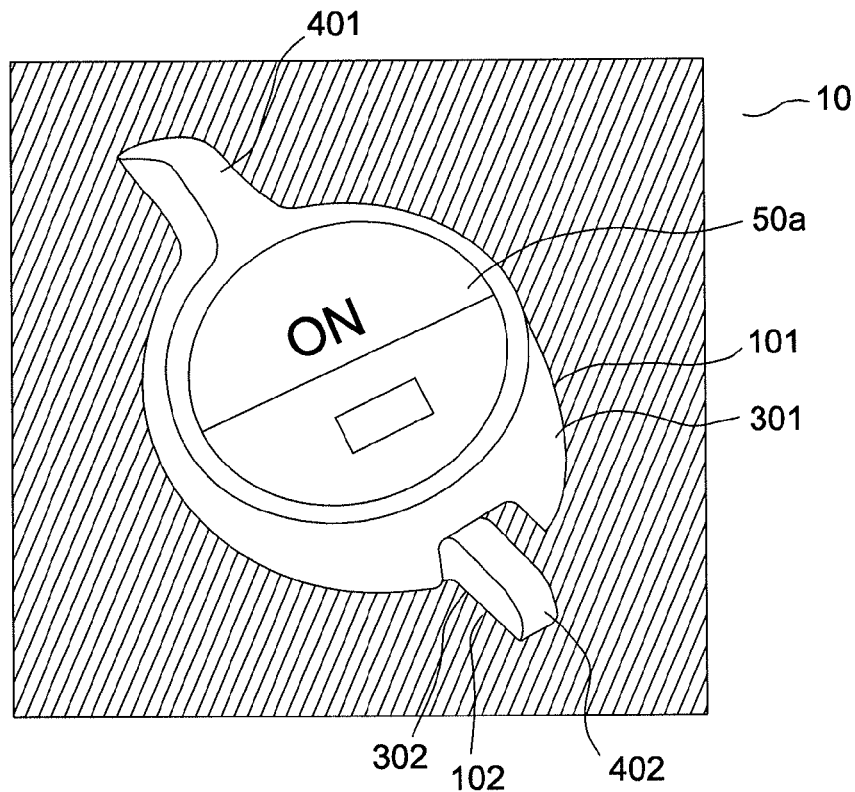
FIG. 3 shows a third embodiment of an operator control device 10.

The operator control device 10, depicted in FIG. 3, has two rotary actuators 101, 102. The operator control bodies 301, 302 exhibit in each case a grip area 401, 402 that is constructed in the manner of a lever. The first operator control body 301 is designed in such a way that it encloses the operator control device 10 on the front face and partially in the radial direction. The first operator control body 301 also has an additional operator control element 50a, which is designed, for example, as a pushbutton.

Figure 4:
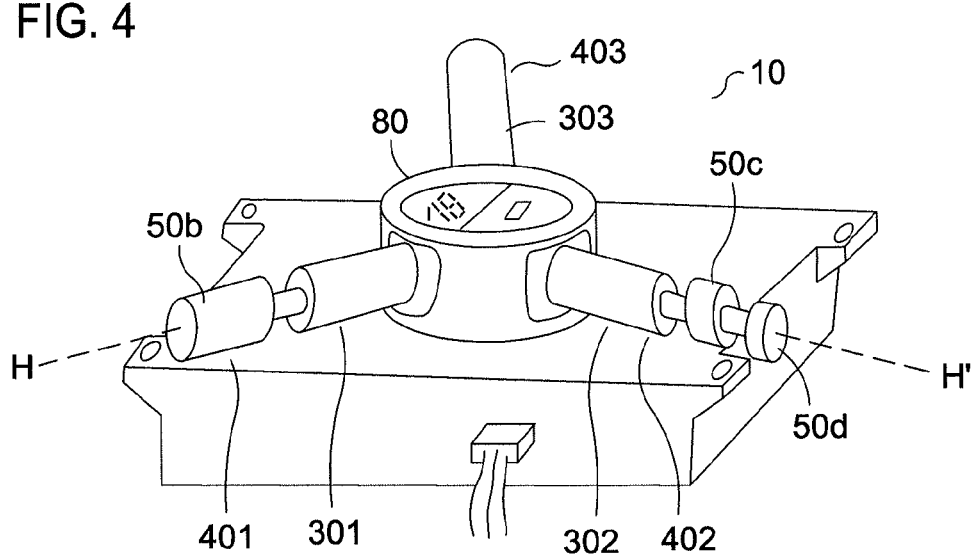
FIG. 4 shows a fourth embodiment of an operator control device 10.

The operator control device 10, depicted in FIG. 4, is disposed, for example, in a center console in the passenger compartment of a vehicle. The operator control device 10 has three rotary actuators 101, 102, 103. The operator control bodies 301, 302, 303 exhibit in each case a grip area 401, 402, 403 that is constructed like a lever. The first operator control body 301 has in the grip area 401 an additional operator control element 50b. The additional operator control element 50b is mounted, for example, in a rotatable manner about a first lever axis H. The second operator control body 302 has in the grip area 402 two additional operator control elements 50c, 50d. A first operator control element 50c is mounted, for example, in a displaceable manner along a second lever axis H'. A second operator control element 50d is mounted, for example, in a rotatable manner about the second lever axis H'. The operator control device 10 has a cover 80, which is mechanically coupled with a base body, which is, for example, a part of the center console. For example, the base body also has an electronic contact system of the rotary actuators and additional mechanical and/or electrical components, which are necessary for the mechanical and/or electrical coupling of the operator control device 10 with additional devices of the vehicle—for example, for connecting the operator control device 10 to a LIN bus and/or CAN bus in the vehicle and/or for a direct connection.

Figure 5:
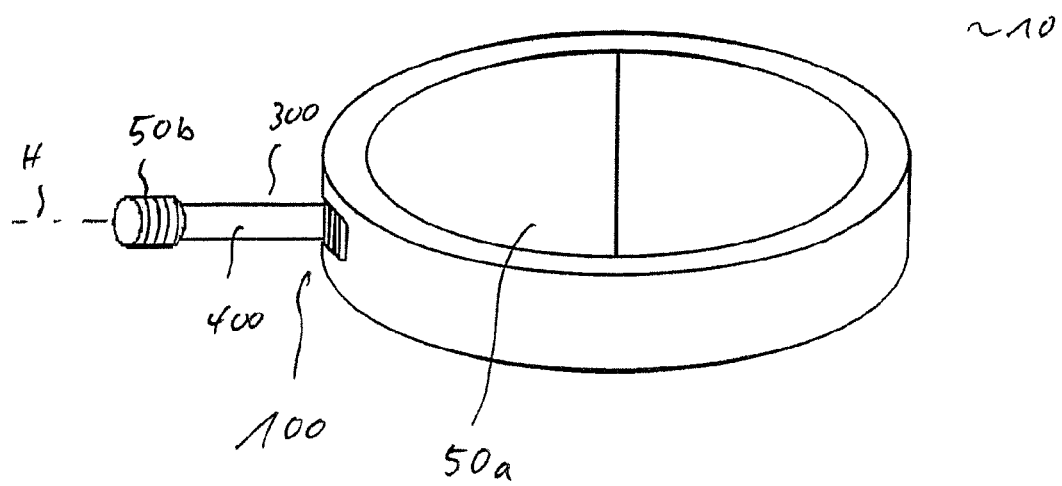
FIG. 5 shows a fifth embodiment of an operator control device 10.

FIG. 5 shows a fifth embodiment of the operator control device 10. The operator control device 10 is disposed, for example, in the center console in the passenger compartment of a vehicle. The operator control device 10 has only one rotary actuator 100. The rotary body 200 and the operator control body 300 are mechanically coupled. The grip area of the operator control body 300 is constructed like a lever. The grip area 400 of the operator control body can be pivoted, for example, over a predefined angular range. The operator control device has in the grip area 400 of the operator control body 300 an additional operator control element 50b. The operator control element 50b is mounted, for example, in a rotatable manner about the lever axis H. The operator control element 50b can be mounted, additionally or as an alternative, in a displaceable manner along the lever axis H. The cover can exhibit additional operator control elements 50a. It is also possible for the operator control device 10 to have a carrier body 70. The carrier body 70 can be arranged in such a way that the rotary body 200 encloses it radially, wherein the carrier body 70 is arranged in a rotationally rigid manner in relation to the axis of rotation A. The carrier body 70 could exhibit additional operator control elements 50a and/or display units 60.

LIST OF REFERENCE NUMERALS AND LETTERS 10 operator control device
50, 50a, 50b, 50c, 50d operator control element
60 display unit 70 carrier body
100 rotary actuator
101 first rotary actuator
102 second rotary actuator
200 rotary body
201 first rotary body
202 second rotary body
300 operator control body
301 first operator control body
302 second operator control body
401 grip area
402 grip area
A axis of rotation
H, H' lever axis The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operator control device for use in operating a plurality of functions, the operator control device comprising:
    a first rotary actuator comprising a first rotary body and a first operator control body, the first operator control body is directly coupled to the first rotary body along only a first attachment side of the first rotary body;
    a second rotary actuator comprising a second rotary body and a second operator control body, the second operator control body being directly coupled with a second attachment side of the second rotary body, wherein the first side attachment side of the first rotary body is perpendicularly oriented to the second attachment side of the second rotary body;
    wherein the first rotary actuator and the second rotary actuator are assigned to operate functions;
    wherein the first rotary body and the second rotary body are arranged coaxially so as to be rotatable about a common axis of rotation; and
    wherein at least one of the first operator control body and the second operator control body comprises a grip area operatively configured as a lever for its respective rotary body.

2. The operator control device according to claim 1, wherein one of the first rotary body and the second rotary body is arranged coaxially at least partially within the other of the first rotary body and the second rotary body.

3. The operator control device according to claim 2, wherein the functions operated are vehicle functions.

4. The operator control device according to claim 1, wherein at least one of the first operator control body and the second operator control body further comprises a pressure switch configured to provide an additional function.

5. The operator control device according to claim 4, wherein the pressure switch is operatively disposed in the grip area of the at least one operator control body.

6. The operator control device according to claim 5, wherein the pressure switch is mounted at least one of displaceably and rotatably relative to a lever axis of the at least one operator control body.

7. The operator control device according to claim 1, wherein at least one operator control body comprises a display unit.

8. The operator control device according to claim 7, wherein the display unit is at least one of an electrical and mechanical display.

9. The operator control device according to claim 1, wherein actuation of the first operator control body rotates the first rotary body about the common axis as a result of said direct coupling of the first operator control body to the first rotary body along only the first attachment side of the first rotary body.

* * * * *